United States Patent
Tomimoto et al.

(10) Patent No.: US 10,771,555 B2
(45) Date of Patent: Sep. 8, 2020

(54) RELAY DEVICE AND COMPUTER-READABLE MEDIUM

(71) Applicant: SoftBank Corp., Tokyo (JP)

(72) Inventors: Kazuma Tomimoto, Tokyo (JP); Masayuki Miyashita, Tokyo (JP); Manabu Mikami, Tokyo (JP); Ryo Yamaguchi, Tokyo (JP); Hitoshi Yoshino, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/569,677

(22) Filed: Sep. 13, 2019

(65) Prior Publication Data

US 2020/0028910 A1    Jan. 23, 2020

Related U.S. Application Data

(63) Continuation of application No. PCT/JP2018/010618, filed on Mar. 16, 2018.

(30) Foreign Application Priority Data

| Mar. 16, 2017 | (JP) | ................................. 2017-051453 |
| Mar. 16, 2017 | (JP) | ................................. 2017-051524 |
| Apr. 12, 2017 | (JP) | ................................. 2017-079306 |

(51) Int. Cl.
*H04L 29/08* (2006.01)
*G06Q 30/06* (2012.01)
*H04B 7/14* (2006.01)

(52) U.S. Cl.
CPC ..... *H04L 67/1097* (2013.01); *G06Q 30/0619* (2013.01); *G06Q 30/0635* (2013.01); *H04B 7/14* (2013.01); *H04L 67/02* (2013.01)

(58) Field of Classification Search
CPC ................................................. G06Q 30/00–08
See application file for complete search history.

(56) References Cited

U.S. PATENT DOCUMENTS

| 7,720,742 B1 * | 5/2010 | Mauro | ................... G06Q 40/00 705/37 |
| 8,799,674 B1 * | 8/2014 | Leighton | ............... G06F 21/602 713/189 |

(Continued)

FOREIGN PATENT DOCUMENTS

| JP | 2002133163 A | 5/2002 |
| JP | 2004102370 A | 4/2004 |

(Continued)

OTHER PUBLICATIONS

StarBurst OmniCast Delivers First Scalable Content Distribution Management Software to Operate Over Any IP Network. Business/Technology Editors . Business Wire ; New York [New York]Nov. 29, 1999: 1. (Year: 1999).*

(Continued)

*Primary Examiner* — Michael Misiaszek

(57) ABSTRACT

A relay device is provided that is provided on a first network hierarchy level and relays communications via a network hierarchy level higher than the first level, between a plurality of nodes subordinate to the relay device and a sales broker website, and includes: an application storage unit storing a sales broker application; and an application execution unit executing the sales broker application to cause the relay device to function as: an order data reception unit receiving order data including a plurality of contents; a first order data transmission unit transmitting the order data to the sales broker website; and a second order data transmission unit transmitting, when an order receiver node receiving an order for the product is any of the plurality of nodes, at least a part (Continued)

of the plurality of contents to the order receiver node without involving a level higher than the first level.

5 Claims, 15 Drawing Sheets

(56) References Cited

U.S. PATENT DOCUMENTS

| | | | | |
|---|---|---|---|---|
| 2002/0095485 | A1* | 7/2002 | Maekawa | H04L 41/06 709/223 |
| 2005/0278410 | A1* | 12/2005 | Espino | H04L 67/2828 709/201 |
| 2007/0132549 | A1 | 6/2007 | Ichikawa | |
| 2009/0048917 | A1* | 2/2009 | Blake | G06Q 30/02 705/14.14 |
| 2009/0109848 | A1 | 4/2009 | Hato | |
| 2010/0223384 | A1* | 9/2010 | Takeda | G06F 8/65 709/226 |
| 2010/0246580 | A1 | 9/2010 | Kaganoi | |
| 2012/0096546 | A1* | 4/2012 | Dilley | H04L 63/0471 726/22 |
| 2013/0145001 | A1* | 6/2013 | Qian | H04L 67/1008 709/223 |
| 2013/0282890 | A1* | 10/2013 | Ma | G06F 16/24568 709/224 |
| 2016/0203059 | A1* | 7/2016 | Kanevsky | G06F 11/1456 707/653 |
| 2016/0364798 | A1* | 12/2016 | Rooney | G06Q 40/04 |
| 2017/0076072 | A1* | 3/2017 | Koren | G06F 21/126 |
| 2018/0088589 | A1* | 3/2018 | Hasegawa | G05D 1/0088 |

FOREIGN PATENT DOCUMENTS

| | | |
|---|---|---|
| JP | 2006195814 A | 7/2006 |
| JP | 2006215897 A | 8/2006 |
| JP | 2007164529 A | 6/2007 |
| JP | 2008187664 A | 8/2008 |
| JP | 2009265864 A | 11/2009 |
| JP | 2010190863 A | 9/2010 |
| JP | 2010232818 A | 10/2010 |
| JP | 2011097507 A | 5/2011 |
| JP | 2013004072 A | 1/2013 |
| JP | 2014239330 A | 12/2014 |
| JP | 2015166933 A | 9/2015 |
| JP | 2018014077 A | 1/2018 |
| WO | 2006095508 A1 | 9/2006 |

OTHER PUBLICATIONS

Web switching comes of age. Passmore, David. Business Communications Review; Oct. 1999; 29, 10; ProQuest p. 18 (Year: 1999).*
On the edge. Greenberg, Karl. Brandweek; Sep. 4, 2000; 41, 34; ProQuest Central p. IQ42 (Year: 2000).*
Gaining an "edge" in IoT. Gold, Jack . Computerworld.com ; Framingham Framingham: Computerworld, Inc. (Oct. 18, 2016) (Year: 2016).*
International Search Report and (ISA/237) Written Opinion of the International Search Authority for International Patent Application No. PCT/JP2018/010618, mailed by the Japan Patent Office dated Jun. 19, 2018.
Decision to Grant a Patent issued for counterpart Japanese Application No. 2017-051453, drafted by the Japan Patent Office dated Jun. 7, 2017.
Office Action issued for counterpart Japanese Application No. 2017-079306, issued by the Japan Patent Office dated Jun. 12, 2018(drafted on Jun. 7, 2018).
Office Action issued for counterpart Japanese Application No. 2017-051524, issued by the Japan Patent Office dated Jun. 12, 2018(drafted on Jun. 7, 2018).
Decision to Grant a Patent issued for counterpart Japanese Application No. 2017-051524, issued by the Japan Patent Office dated Aug. 21, 2018(drafted on Aug. 15, 2018).
Decision of Refusal issued for counterpart Japanese Application No. 2017-079306, issued by the Japan Patent Office dated Nov. 6, 2018(drafted on Oct. 30, 2018).
Decision to Grant a Patent issued for counterpart Japanese Application No. 2017-079306, issued by the Japan Patent Office dated Feb. 19, 2019 (drafted on Feb. 13, 2019).

* cited by examiner

RELAY DEVICE AND COMPUTER-READABLE MEDIUM

The contents of the following Japanese patent applications are incorporated herein by reference:
2017-051453 filed in JP on Mar. 16, 2017
2017-051524 filed in JP on Mar. 16, 2017
2017-079306 filed in JP on Apr. 12, 2017
PCT/JP2018/010618 filed on Mar. 16, 2018

BACKGROUND

1. Technical Field

The present invention relates to a relay device and a computer-readable medium.

2. Related Art

A sales broker website has been known that serves as a broker between an orderer that orders a product through a network and an order receiver that receives the order for the product (see, for example, Patent Document 1).

PRIOR ART LITERATURE

Patent Document

[Patent Document 1] Japanese Patent Application Publication No. 2002-133163

SUMMARY

It is desirable to provide a technique with which a status of use of a network resource by a sales broker website can be appropriately managed.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

First Embodiment

Figure 1:
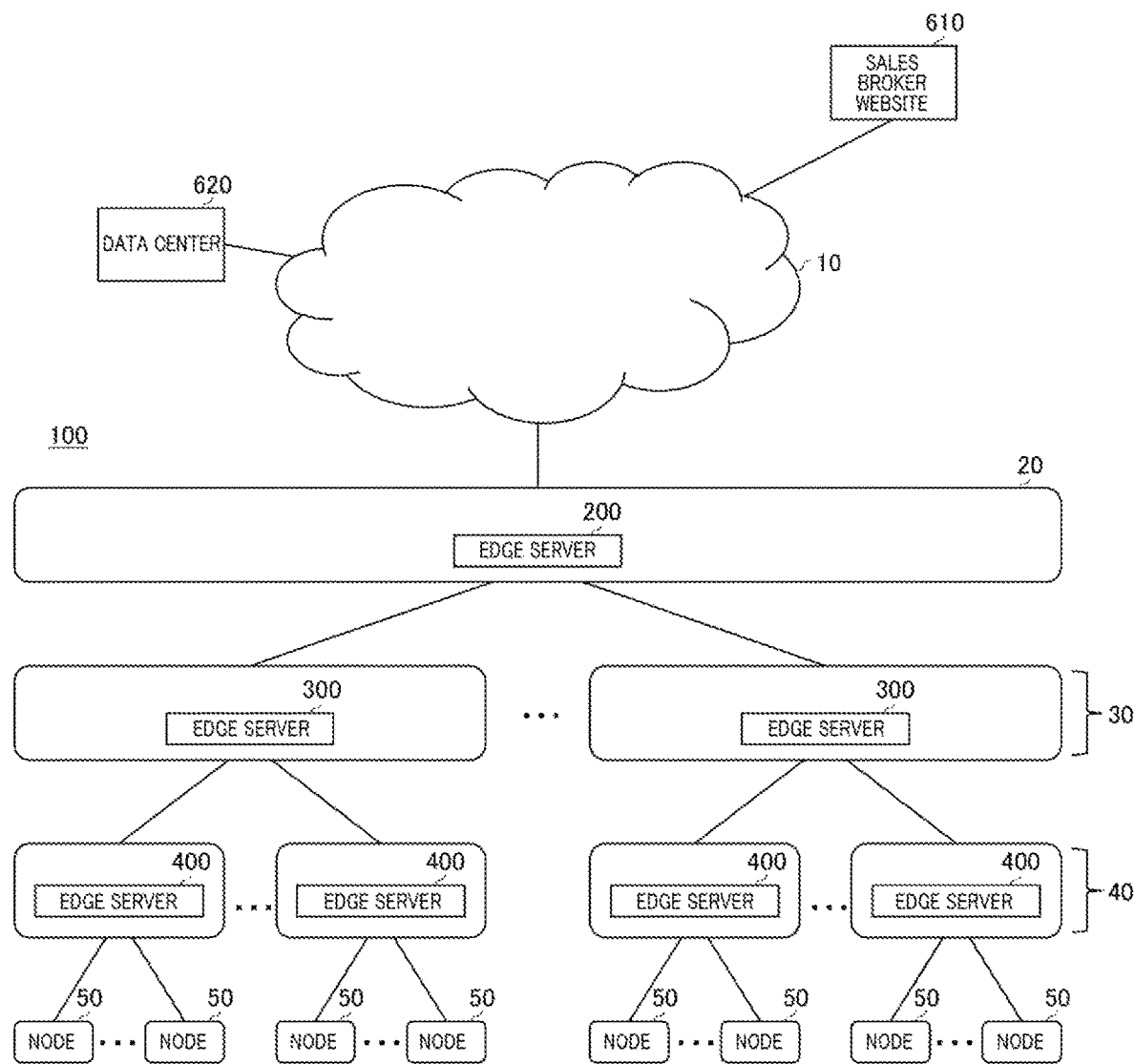
FIG. 1 schematically shows an example of a system 100.

FIG. 1 schematically shows an example of a system 100. The system 100 according to the present embodiment includes a plurality of relay devices each provided on a corresponding one of a plurality of network hierarchy levels. The system 100 is provided by a telecommunications carrier for example.

FIG. 1 shows an example in which the system 100 includes an edge server 200 provided on a network 20, a plurality of edge servers 300 provided on a network hierarchy level 30 lower than the network 20, and a plurality of edge servers 400 provided on a network hierarchy level 40 lower than the network hierarchy level 30. For example, the edge servers 400 are provided in respective prefectures and relay communications by nodes 50 in the prefectures, the edge servers 300 are provided in respective subprefectures and relay communications by the edge servers 400, and the edge server 200 relays communications by the edge servers 300.

The number of network hierarchy levels in the system 100 is not limited to this and may be any suitable number. The edge server 200, the edge servers 300, and the edge servers 400 are examples of a relay device. The network hierarchy level 40 is an example of a first network hierarchy level.

The nodes 50 may be any device having a communication function. The nodes 50 are, for example, a mobile phone such as a smartphone, a tablet terminal, a Personal Computer (PC), or the like.

The system 100 according to the present embodiment relays communications between a plurality of nodes 50 and a sales broker website 610 performed via a cloud network 10. The cloud network 10 includes the Internet and the like.

The edge servers 400 according to the present embodiment receive order data transmitted by a node 50 of an orderer that orders a product (which may also be referred to as an orderer node), among a plurality of nodes 50 subordinate to the edge server 400. For example, the order data includes orderer information such as the name and address of the orderer, product information such as the number and the price of products, and order receiver information such as identification information about the order receiver that receives an order for the product.

When the node 50 of the order receiver that receives an order for the product (which may also be referred to as the order receiver node) is any one of the plurality of nodes 50 subordinate to the edge server 400, the edge server 400 transmits the order data, destined to the sales broker website 610, to the corresponding edge server 300, and also directly transmits the order data to the order receiver node. The direct transmission of the order data to the order receiver node may refer to transmitting the order data to the order receiver node without involving a network hierarchy level higher than the network hierarchy level 40, and may include transmission to the orderer node from the edge server 400 via relay equipment such as a router.

Conventionally, the sales broker website 610 has intermediated communications between the orderer node and the order receiver node. Thus, the order data transmitted by the orderer node has been transmitted from the edge server 400 to the sales broker website 610 and then has been transmitted from the sales broker website 610 to the order receiver node via the edge server 400. On the other hand, with the edge server 400 according to the present embodiment, the order data is directly transmitted to the order receiver node, whereby the amount of communications from the sales broker website 610 to the edge server 400 can be reduced. Although the amount of communications reduced is not large for a single order, a huge amount of communications can be reduced through an increase in the amount of orders. Furthermore, when a telecommunications carrier that provides the system 100 charges the sales broker website 610 a fee in accordance with the communication amount, the amount charged can be appropriately reduced.

When the order receiver node is none of the plurality of subordinate nodes 50, the edge server 400 transmits the order data to the edge server 300. When the order receiver node is any of the plurality of nodes 50 subordinate to the edge server 400 that is on a lower level than the edge server 300, the edge server 300 transmits the order data, destined to the sales broker website 610, to the edge server 200, and also transmits the order data to the order receiver node via the edge server 400 on the lower level.

When the order receiver node is none of the plurality of nodes 50 subordinate to the edge server 400 that is on a lower level than the edge server 300, the edge server 300 transmits the order data to the edge server 200. The edge server 200 transmits the order data to the sales broker website 610, and also transmits the order data to the order receiver node via the edge server 300 and the edge server 400 that are on higher levels than the order receiver node.

In a case that there are a plurality of destinations of the order data other than the sales broker website 610, the edge server 400 performs an operation suitable for such a situation. The case that there are a plurality of destinations of the order data other than the sales broker website 610 refers to a case where there are a plurality of order receiver nodes, and a case where order data is transmitted to a node 50 other than the order receiver node, such as a bank for example.

When a plurality of destinations are all subordinate nodes 50, the edge server 400 directly transmits the order data to each of the destinations. When some of a plurality of destinations are subordinate nodes 50 and the others are not subordinate nodes 50, the edge server 400 transmits the order data to the edge server 300, and also directly transmits the order data to the subordinate destination nodes. When none of the plurality of destinations is a subordinate node 50, the edge server 400 transmits the order data to the edge server 300.

As described above, the edge server 400, the edge server 300, and the edge server 200 may execute the sales broker function in accordance with their hierarchal levels. The edge server 400, the edge server 300, and the edge server 200 may receive and store a sales broker application from the sales broker website 610 or a data center 620, and execute the sales broker application to implement the sales broker function.

Figure 2:
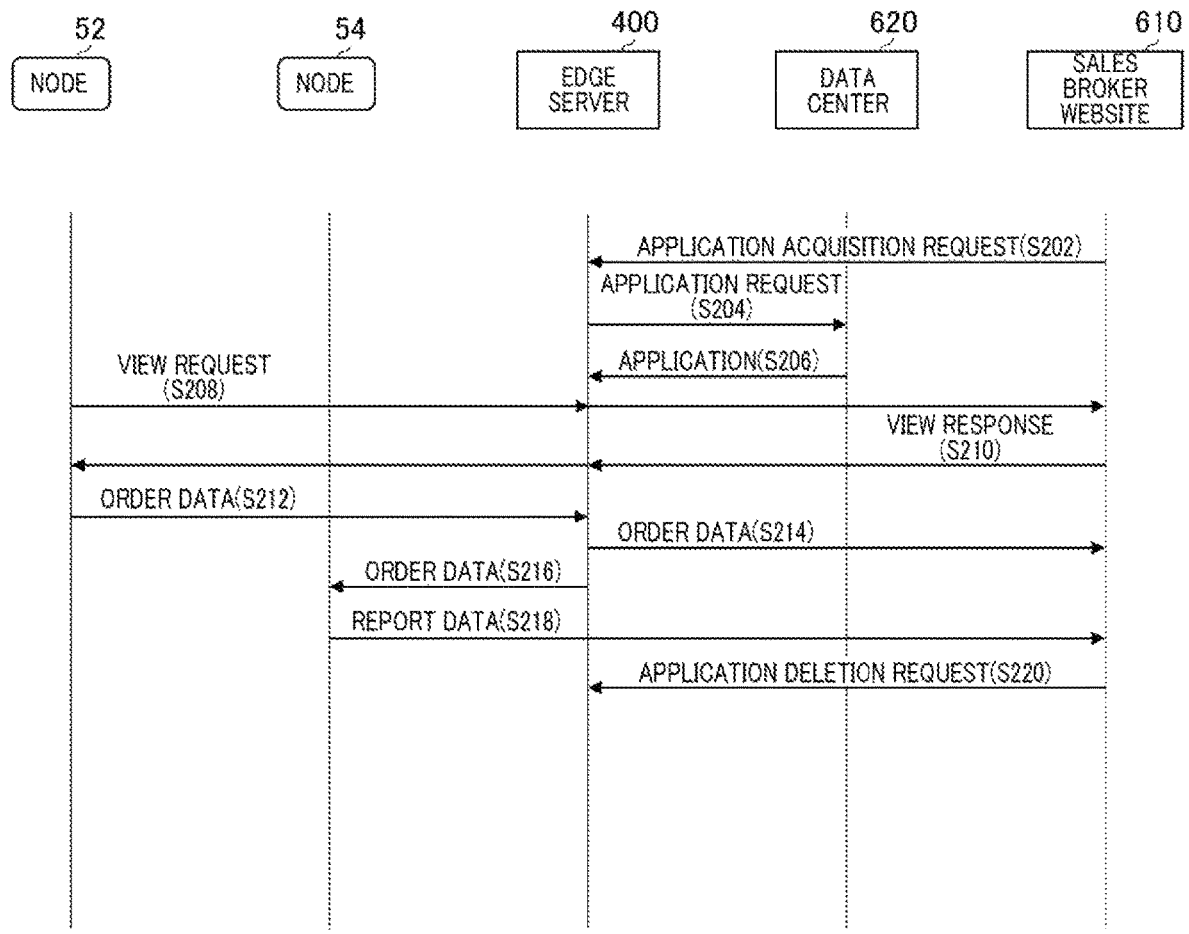
FIG. 2 schematically shows an example of a flow of processing executed by an edge server 400.

FIG. 2 schematically shows an example a flow of processing executed by the edge server 400.

Here, a description is given for an example of a case where the edge server 400 receives the sales broker application from the data center 620, and executes the sales broker application to implement the sales broker function.

In step (step may be abbreviated as S) 202, the sales broker website 610 transmits an application acquisition request to the edge server 400. For example, the sales broker website 610 transmits the application acquisition request to the edge server 400 on a higher level than the node 50 as a target of providing a sales broker service.

In S204, the edge server 400 transmits an application request to the data center 620, in response to the application acquisition request received from the sales broker website 610. In S206, the data center 620 transmits the sales broker application to the edge server 400 in response to the application request received from the edge server 400. The edge server 400 stores and executes the sales broker application received.

In S208, a node 52 transmits a product view request to the sales broker website 610 via the sales broker application executed in the edge server 400. In S210, the sales broker website 610 performs view response via the sales broker application executed in the edge server 400. As the view response, information about the product is transmitted to the node 52 for example.

In S212, the node 52 transmits the order data to the edge server 400. Here, the description continues assuming that the order receiver node is a node 54 that is subordinate to the edge server 400 as is the node 52.

In S214, the edge server 400 transmits the order data to the sales broker website 610. In S216, the edge server 400 directly transmits the order data to the node 54. The order receiver with the order receiver node performs shipping and the like of the product, in accordance with the order data received. In S218, the order receiver node transmits report data, for reporting completion of the shipping of the product and the like, to the sales broker website 610.

In S220, the sales broker website 610 transmits an application deletion request to the edge server 400. The edge server 400 deletes the sales broker application in accordance with the application deletion request received.

With the configuration described above where the sales broker application is provided on the edge server 400 only as long as the sales broker service needs to be executed by the edge server 400, the consumed amount of the storage capacity of the edge server 400 can be reduced compared with a case where the sales broker application is constantly provided on the edge server 400. Thus, for example, when a charge is imposed in accordance with the consumed amount of storage area of the edge server 400, the amount charged can be appropriately reduced.

As in the example shown in FIG. 2, the sales broker application may be provided on the edge server 300, only as long as the sales broker service needs to be executed by the edge server 300. The sales broker application may be provided on the edge server 200, only as long as the sales broker service needs to be executed by the edge server 200.

Figure 3:
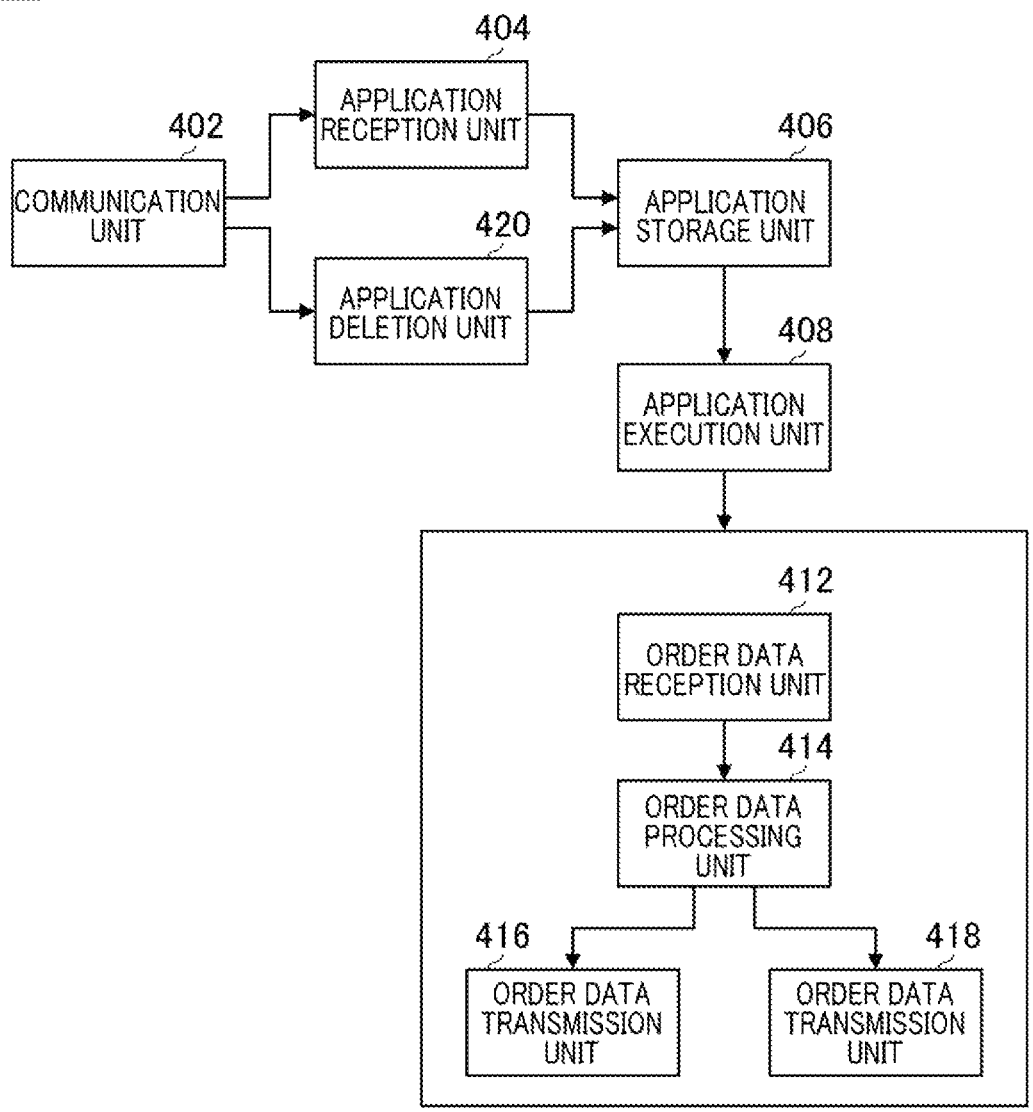
FIG. 3 schematically shows an example of a functional configuration of the edge server 400.

FIG. 3 schematically shows an example of a functional configuration of the edge server 400. The edge server 400 includes a communication unit 402, an application reception unit 404, an application storage unit 406, and an application execution unit 408. The edge server 400 functions as an order data reception unit 412, an order data processing unit 414, an order data transmission unit 416, and an order data transmission unit 418, with the application execution unit 408 executing the sales broker application stored in the application storage unit 406.

The communication unit 402 performs various communications. The communication unit 402 may communicate with the sales broker website 610. The communication unit 402 may communicate with the node 50. The communication unit 402 may relay communications between the node 50 and the sales broker website 610.

The application reception unit 404 receives the sales broker application. For example, the application reception unit 404 receives the sales broker application in accordance with an application acquisition request received by the communication unit 402 from the sales broker website 610. The application reception unit 404 may receive the sales broker application from the data center 620. The application reception unit 404 may receive the sales broker application from the sales broker website 610.

The application storage unit 406 stores the sales broker application. The application storage unit 406 may store the sales broker application received by the application reception unit 404.

The application execution unit 408 executes the sales broker application stored in the application storage unit 406. The application execution unit 408 may execute the sales broker application to cause the edge server 400 to function as the order data reception unit 412, the order data processing unit 414, the order data transmission unit 416, and the order data transmission unit 418.

The order data reception unit 412 receives order data transmitted by an orderer node among a plurality of nodes 50 subordinate to the edge server 400.

The order data processing unit 414 processes the order data received by the order data reception unit 412. Upon determining that the order receiver node is any of the plurality of nodes 50 subordinate to the edge server 400 by referring to the order receiver information included in the order data, the order data reception unit 412 may cause the order data transmission unit 416 to transmit the order data to the sales broker website 610, and may also cause the order data transmission unit 418 to directly transmit the order data to the order receiver node.

The order data processing unit 414 may cause the order data transmission unit 418 to transmit all of a plurality of contents in the order data to the order receiver node, or to transmit a part of the plurality of contents in the order data to the order receiver node. For example, the order data processing unit 414 causes the order data transmission unit 418 to transmit the orderer information and the product information, among the orderer information, the product information, and the order receiver information in the order data.

Upon determining that the order receiver node is none of the plurality of nodes 50 subordinate to the edge server 400, the order data processing unit 414 may cause the order data transmission unit 416 to transmit the order data to the edge server 300 on a higher level than the edge server 400.

An application deletion unit 420 deletes the sales broker application stored in the application storage unit 406. The application deletion unit 420 may delete the sales broker application from the application storage unit 406 when a first predetermined condition is satisfied. The predetermined condition may be reception of an instruction to delete the sales broker application, issued from the sales broker website 610 for example. Furthermore, for example, when use by date of the sales broker application has been set by the sales broker website 610, the predetermined condition may be arrival of the use by date.

After the application deletion unit 420 has deleted the sales broker application from the application storage unit 406, the application reception unit 404 may receive and store in the application storage unit 406 the sales broker application when a second predetermined condition is satisfied. For example, the second predetermined condition may be reception of an acquisition request for acquiring the sales broker application from the sales broker website 610. For example, when an acquisition schedule for the sales broker application has been designated by the sales broker website 610, the second predetermined condition may be arrival of an acquisition timing for the sales broker application indicated by the acquisition schedule.

The edge server 300 may also have a configuration similar to that of the edge server 400. The edge server 200 may also have a configuration similar to the edge server 400.

Figure 4:
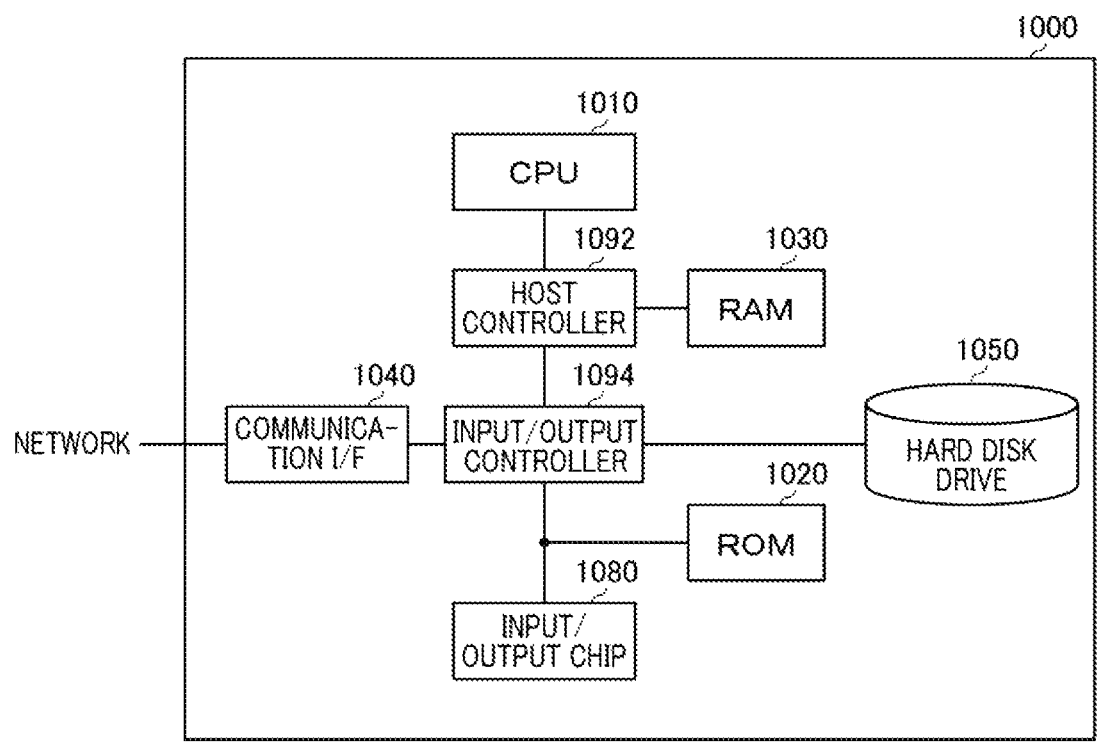
FIG. 4 schematically shows an example of a hardware configuration of a computer 1000 that functions as the edge server 400.

FIG. 4 schematically shows an example of a hardware configuration of a computer 1000 that functions as the edge server 400. The computer 1000 according to the present embodiment includes a CPU peripheral unit and an input/output unit. The CPU peripheral unit includes a CPU 1010 and a RAM 1030 that are connected to each other by a host controller 1092. The input/output unit includes a ROM 1020, a communication I/F 1040, a hard disk drive 1050, and an input/output chip 1080 that are connected to the host controller 1092 by an input/output controller 1094.

The CPU 1010 operates according to programs stored in the ROM 1020 and the RAM 1030, thereby controlling each unit. The communication I/F 1040 performs wired or wireless communication with another device through a network. The communication I/F 1040 functions as hardware that performs communications. The hard disk drive 1050 stores a program and data used by the CPU 1010.

The ROM 1020 stores therein a boot program executed by the computer 1000 at the time of activation, a program depending on the hardware of the computer 1000, and the like. The input/output chip 1080 connects various input/output devices via a parallel port, a serial port, a keyboard port, a mouse port, and the like to the input/output controller 1094.

A program provided to the hard disk drive 1050 via the RAM 1030 is provided by a user while being stored in a recording medium such as an IC card. The program is read from the recording medium, installed in the hard disk drive 1050 via the RAM 1030, and is executed by the CPU 1010.

A program that is installed in the computer 1000 and causes the computer 1000 to function as the edge server 400 may instruct the CPU 1010 and the like to cause the computer 1000 to function as each unit of the edge server 400. The computer 1000 reads information processing written in such programs to function as the communication unit 402, the application reception unit 404, the application storage unit 406, the application execution unit 408, and the application deletion unit 420 that are specific means based on cooperation between software and the various hardware resources described above. Then, by implementing calculation or processing of information in accordance with a purpose of use of the computer 1000 according to the present embodiment with these specific units, a unique edge server 400 suitable for the purpose of use is established.

Second Embodiment

Figure 5:
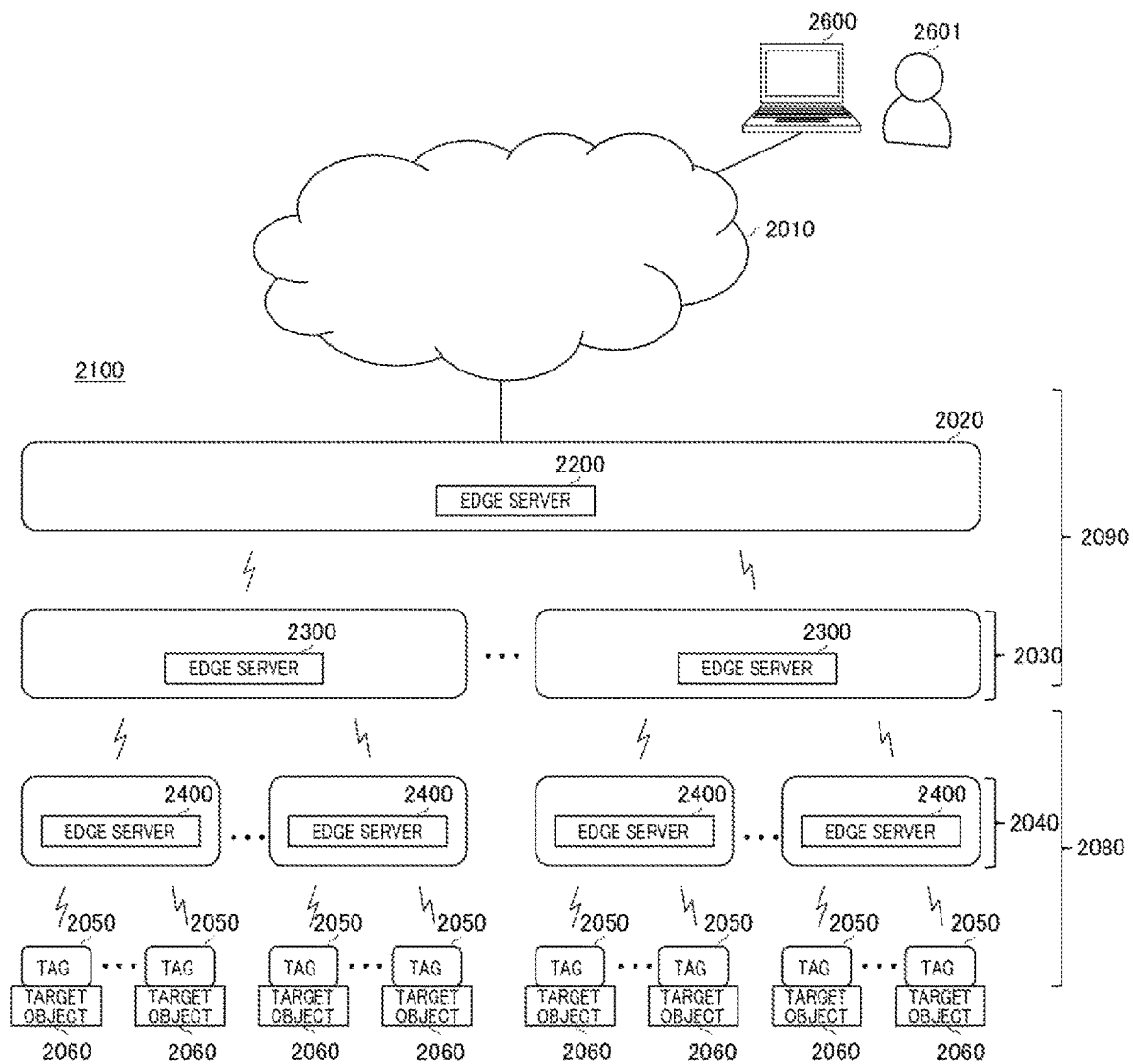
FIG. 5 schematically shows an example of a system 2100.

FIG. 5 schematically shows an example of a system 2100. The system 2100 according to the present embodiment includes a plurality of relay devices each provided on a corresponding one of a plurality of network hierarchy levels. The system 2100 is provided by a telecommunications carrier for example.

FIG. 5 shows an example in which the system 2100 includes an edge server 2200 provided on a network 2020, a plurality of edge servers 2300 provided on a network hierarchy level 2030 lower than the network 2020, and a plurality of edge servers 2400 provided on a network hierarchy level 2040 lower than the network hierarchy level 2030. The number of network hierarchy levels in the system 2100 is not limited to this and may be any suitable number. The edge server 2200, the edge servers 2300, and the edge servers 2400 are examples of a relay device.

In this example, a lower level network hierarchy 2080 may comply with a first communication scheme and a higher level network hierarchy 2090 may comply with a second communication scheme having higher reliability than the first communication scheme. The first communication scheme is a communication scheme in which collision control is not performed, and the second communication scheme is a communication scheme in which the collision control is performed. For example, the first communication scheme may be what is known as Long-Range (LoRa), what is known as 5G Internet of Thing (IoT), and the like. For example, the second communication scheme may be Long Term Evolution (LTE), what is known as 4G, what is known as 5G, what is known as Narrow Band IoT (NB-IoT), and the like.

In the system 2100 according to the present embodiment, the edge server 2400 receives target object information about a target object 2060 transmitted by a radio tag 2050 attached to the target object 2060.

The target object information is, for example, identification information for identifying the target object 2060. The target object information may be identification information for identifying the radio tag 2050 attached to the target object 2060. In the system 2100, the edge server 2400, the edge servers 2300, and the edge servers 2200 in a hierarchal arrangement properly adjust information and transmit the information to a communication terminal 2600 of a user 2601 that manages the target object 2060, via a cloud network 2010 for example. The cloud network 2010 includes the Internet and the like.

The target object 2060 may be any object the status of which is to be managed. The attachment of radio tag 2050 to the target object 2060, may be arranging it on an outer surface of the target object 2060, attaching it on an outer surface of a package of the target object 2060 or arranging it in the package, or may be arranging it in the target object 2060 depending on the target object 2060.

The concept of properly adjusting and transmitting information may be transmitting only information necessary for the user 2601, may be not transmitting information inappropriate for the user 2601, may be transmitting certain information only, may be not transmitting uncertain information, may be transmitting only information appropriate for the user 2601, or may be not transmitting information unnecessary for the user 2601.

For example, after transmitting the information, received from the radio tag 2050, to the edge server 2300, the edge server 2400 determines whether there has been a change in a status of the target object 2060 based on a status of reception of the information from the radio tag 2050, and transmits the information to the edge server 2300 only when there has been the change. For example, the edge server 2400 may determine whether there has been a change in the status of the target object 2060, based on a timing at which the information is received from the radio tag 2050 and a period in which the information is not received from the radio tag 2050.

When the radio tag 2050 transmits the information to the edge server 2400 by using a communication scheme in which the collision control is not performed, the information transmitted by the radio tag 2050 might fail to reach the edge server 2400. For example, the transmission by the radio tag 2050 may fail two or three times out of ten.

For example, under a status where the edge server 2400 receives the information transmitted by the radio tag 2050 is once in every 10 minutes, when the information is not received 10 minutes after the reception of the information, there are possibilities that the target object 2060 has moved out of a range of communication with the edge server 2400 and that the communication has failed. Thus, when the information is not received 10 minutes after the reception of the information, transmission to the communication terminal 2600 with the target object 2060 immediately determined to have moved out of the range of communication with the edge server 2400 results in transmission of uncertain information.

Under the status where the information transmitted by the radio tag 2050 is received once in every 10 minutes, the edge server 2400 according to the present embodiment determines that the target object 2060 has moved out of the range of communication with the edge server 2400 and transmits the information to the communication terminal 2600, when the information is not received for a predetermined period, such as 30 minutes, after the reception of the information. Thus, uncertain information can be prevented from being transmitted.

The edge server 2400 may transmit the target object information, received from the radio tag 2050 and stored, to the edge server 2300 in accordance with a timing set in advance. This timing may be set to be any timing such as every minute, every hour, every day, or every week. For example, when a change in a status of a target object is detected between a first timing and a second timing that are consecutive, the edge server 2400 transmits the information to the edge server 2300 at the second timing.

For example, the edge server 2400 sets the timing in accordance with an instruction received from the communication terminal 2600 via a network hierarchy level higher than the network hierarchy level 2040 in the system 2100 and the cloud network 2010. Thus, for example, the user 2601 can adjust the timing to adjust the consumption amount of the network resource. The edge server 2400 may set the timing in accordance with an operation by an operator of the edge server 400 or the like.

As described above, with the system 2100 according to the present embodiment, the amount of information transmitted to the communication terminal 2600 through a hierarchal network and the cloud network 2010 can be appropriately reduced, and a network load can be appropriately reduced. Furthermore, when the user 2601 is charged in accordance with the communication amount, the amount charged can be appropriately reduced.

Figure 6:
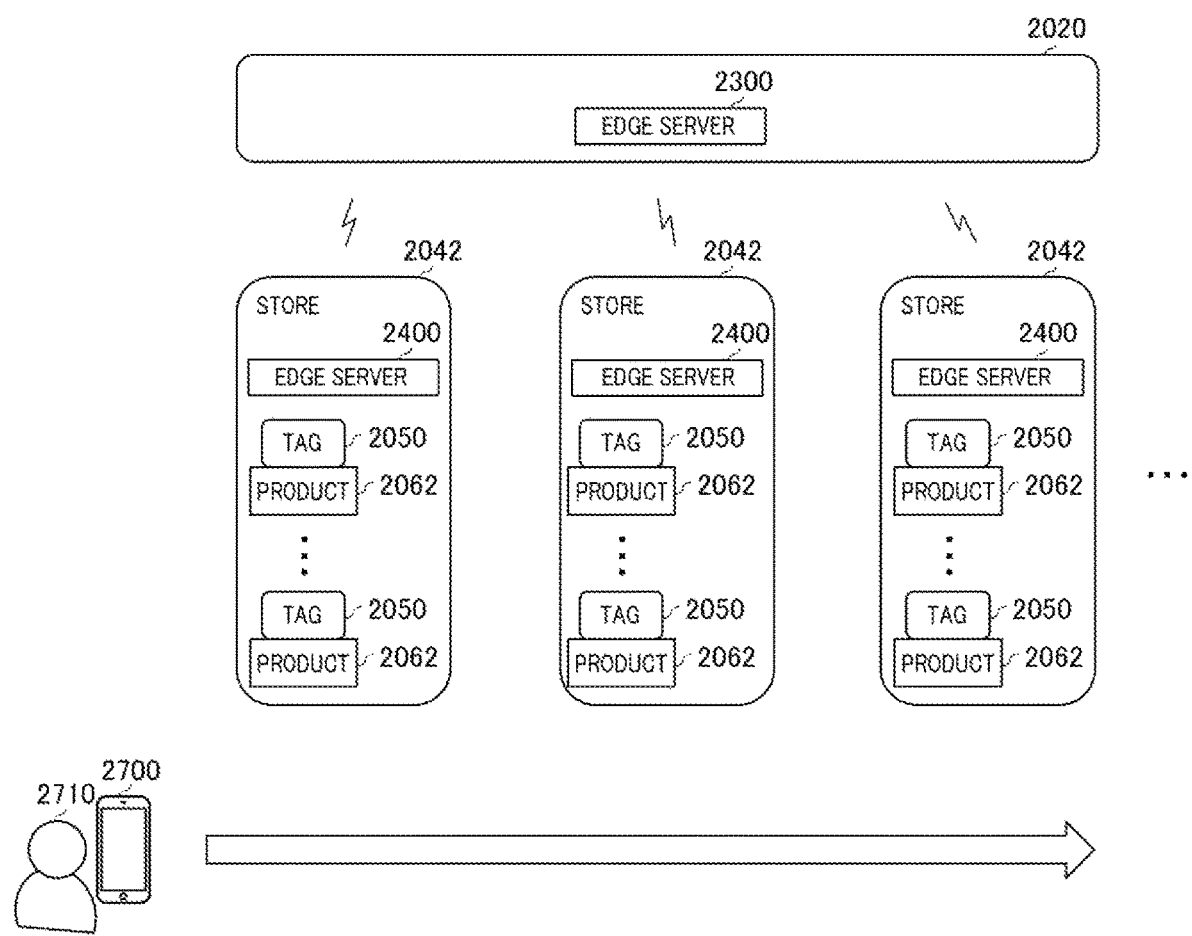
FIG. 6 schematically shows an example of the system 2100 applied to a management of a product 2062.

FIG. 6 schematically shows an example of the system 2100 applied to a management of a product 2062. Here, a description is given for an example of a flow of processing in a case of providing information about the product 2062 in a store 2042, to a user 2710 of a mobile terminal 2700 passing near the store 2042. The mobile terminal 2700 may be a mobile phone such as a smartphone, a tablet terminal, and the like.

The edge server 2300 acquires store product information indicating the product 2062 sold by the store 2042. The edge server 2300 may acquire store product information about a plurality of stores 2042. The edge server 2300 acquires store position information indicating the position of the store 2042. The edge server 2300 may acquire store position information about a plurality of stores 2042.

The edge server 2300 acquires user product information indicating the product 2062 associated with the user 2710 of the mobile terminal 2700. The product 2062 associated with the user 2710 may be a product 2062 to be a purchasing target of the user 2710.

For example, the edge server 2300 receives the user product information from the mobile terminal 2700. The mobile terminal 2700 may display a plurality of products 2062 to the user 2710, and receive a selection from the user 2710, to generate the user product information. The mobile terminal 2700 may generate information generated as a shopping list in accordance with an instruction from the user 2710, and transmit the information to the edge server 2300 as the user product information. The edge server 2300 may receive the user product information from another device. For example, the edge server 2300 receives user product information indicating a product 2062 that is out of stock, from a refrigerator that is provided in a home of the user 2710 and performs out-of-stock management for the product 2062 in the refrigerator.

When the product 2062 included in the user product information is purchased by the user 2710, the edge server 2300 may delete the product 2062 from the user product information. For example, the edge server 2300 receives information indicating the product 2062 purchased by the user 2710 from the mobile terminal 2700. For example, upon receiving the information indicating the product 2062 purchased input from the user 2710, the mobile terminal 2700 transmits the information indicating the purchased product 2062 to the edge server 2300. When payment settlement is performed with the mobile terminal 2700, the mobile terminal 2700 may transmit information indicating the product 2062 for which the payment has been settled, to the edge server 2300 as the information about the product 2062 purchased by the user 2710.

The edge server 2300 acquires terminal position information indicating the position of the mobile terminal 2700. The edge server 2300 may monitor the position of the mobile terminal 2700 by continuously receiving the terminal position information about the mobile terminal 2700.

The edge server 2300 may acquire the terminal position information by using any suitable method. For example, the edge server 2300 acquires the position information about the mobile terminal 2700 managed by a telecommunications carrier that provides a communication service to the mobile terminal 2700. The edge server 2300 may receive the position information transmitted by the mobile terminal 2700. The edge server 2300 may directly receive the position information transmitted by the mobile terminal 2700, may receive the position information via the edge server 2400, or may receive the position information via another relay device.

Based on the user product information, the store product information, the store position information, and the terminal position information acquired, the edge server 2300 executes notification processing for the mobile terminal 2700 when the position of the store 2042 that sells the product indicated by the user product information and the position of the mobile terminal 2700 satisfy a predetermined condition.

For example, as the notification processing, the edge server 2300 causes a communication link to be established between the mobile terminal 2700 and a store terminal of the store 2042 that sells the product indicated by the user product information, and causes the store terminal to transmit notification information to the mobile terminal 2700 via the communication link. As the notification processing, the edge server 2300 may cause the store terminal of the store 2042 that sells the product indicated by the user product information to broadcast the notification information. As the notification processing, the edge server 2300 may transmit the notification information to the mobile terminal 2700.

The notification information may be any information that can make the user 2710 realize that the product 2062 to be the purchasing target of the user 2710 is sold in the store 2042. For example, the notification information may be text data, sound data, and the like for notifying that the product 2062 to be the purchasing target of the user 2710 is sold in the store 2042 near the user 2710. The notification information may include information about a product sold in the store 2042, among the products 2062 included in the user product information. The notification information may include store information indicating the store 2042 selling the product 2062 indicated by the user product information. For example, the store information may be the name of the store, the characteristics of the store, and the like. The notification information may be information for causing the mobile terminal 2700 to perform a predetermined operation. For example, the predetermined operation may be outputting sound, vibrating, emitting light, and the like.

For example, the edge server 2300 executes the notification processing for the mobile terminal 2700, when the mobile terminal 2700 is positioned within a predetermined range from the store 2042 that sells the product indicated by the user product information. Thus, the notification processing is executed when the user 2710 comes close to the store 2042 that sells the product indicated by the user product information, so that the user 2710 can realize that the product 2062 to be the purchasing target is sold by the store 2042.

The edge server 2300 may execute the notification processing upon detecting separation of the mobile terminal 2700 from the store 2042 that sells the product indicated by the user product information. For example, the edge server 2300 executes the notification processing when the mobile terminal 2700 is positioned within a predetermined range from the store 2042 and is then positioned outside the range. Even if the user product information includes the information indicating the product 2062 sold by the store 2042 while the mobile terminal 2700 is positioned within a predetermined range from the store 2042, the edge server 2300 may not execute the notification processing when the mobile terminal 2700 is positioned outside the predetermined range from the store 2042 with the information indicating the product 2062 sold by the store 2042 not included in the user product information. Thus, the notification processing can be prevented from being executed in a case that the product 2062 included in the user product information has been purchased at the store 2042.

Figure 7:
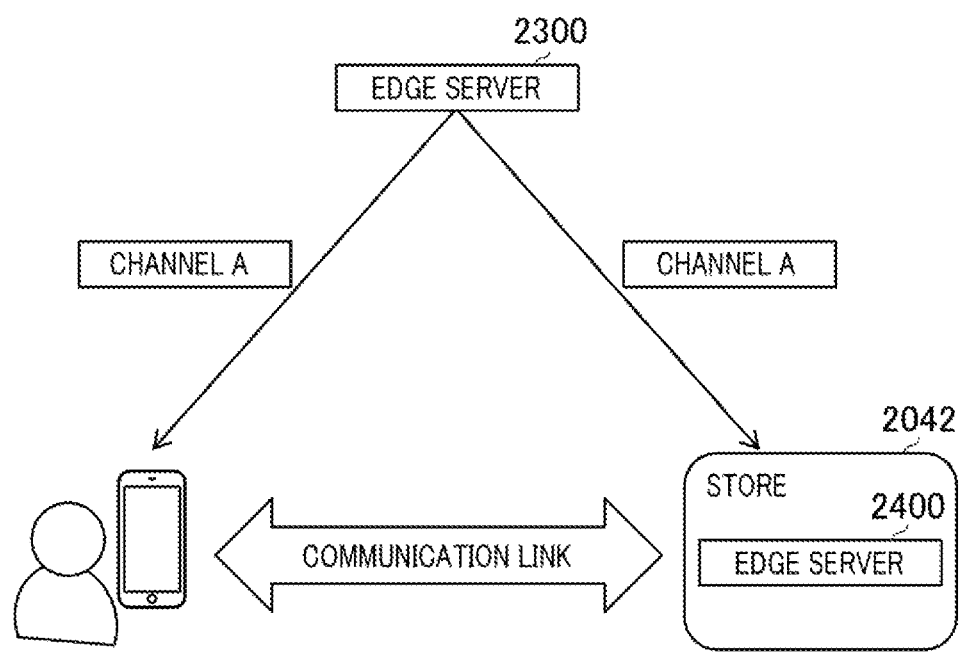
FIG. 7 schematically shows an example of processing executed by the edge server 2300.

FIG. 7 schematically shows an example of notification processing executed by the edge server 2300. In the example shown in FIG. 7, the edge server 2300 causes a communication link to be established between the edge server 2400 and the mobile terminal 2700 when the position of the store 2042 that sells the product indicated by the user product information and the position of the mobile terminal 2700 satisfy a predetermined condition. The edge server 2400 is an example of a store terminal. The store terminal is not limited to the edge server 2400, and may be another communication terminal provided in the store 2042.

For example, the edge server 2300 may cause the communication link to be established between the edge server 2400 and the mobile terminal 2700, in accordance with a Device to Device (D2D) communication scheme. As a specific example, the edge server 2300 may notify each of the edge server 2400 and the mobile terminal 2700 of the same communication channel A, and use the communication channel A to cause the communication link to be established between the edge server 2400 and the mobile terminal 2700. After causing the communication link to be established, the edge server 2300 may cause the edge server 2400 to transmit the notification information to the mobile terminal 2700 via the communication link.

Figure 8:
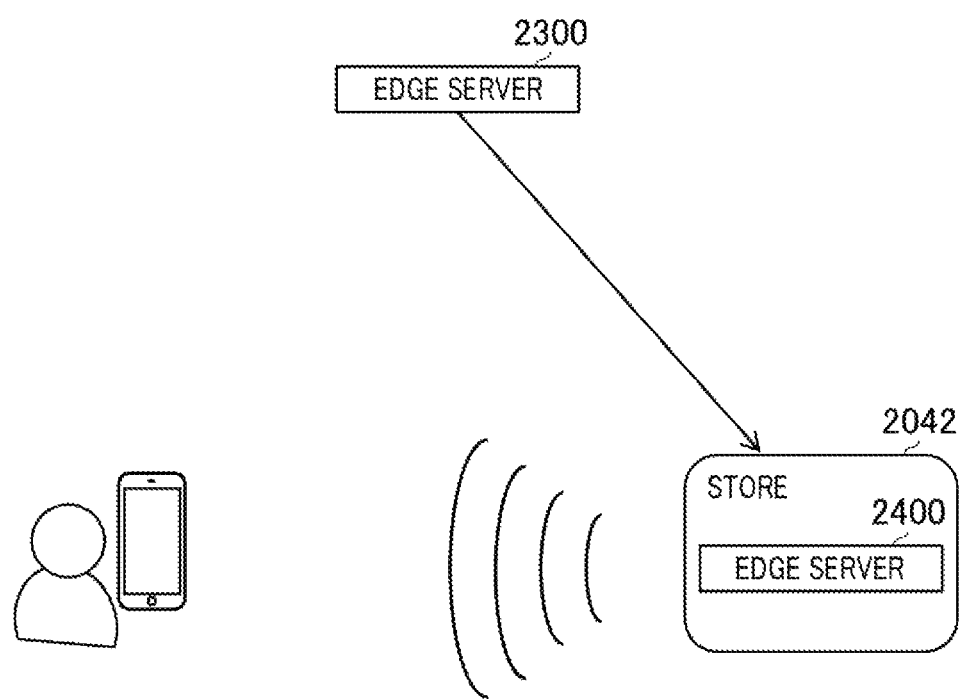
FIG. 8 schematically shows an example of processing executed by the edge server 2300.

FIG. 8 schematically shows an example of notification processing executed by the edge server 2300. In the example shown in FIG. 8, the edge server 2300 may cause the edge server 2400 to broadcast the notification information, when the position of the mobile terminal 2700 and the position of the store 2042 that sells the product indicated by the user product information satisfy a predetermined condition.

Figure 9:
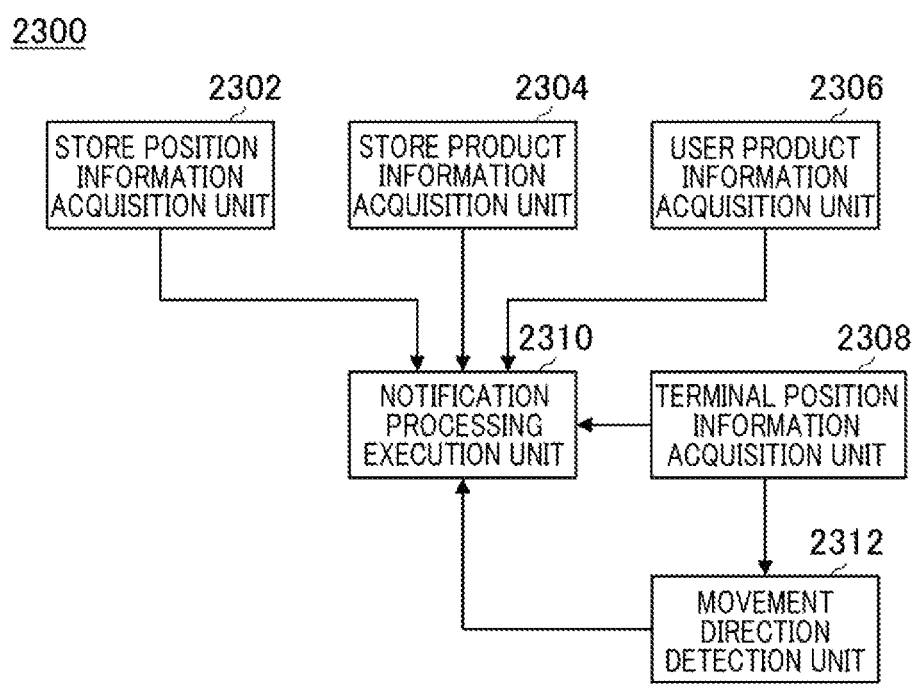
FIG. 9 schematically shows an example of a functional configuration of an edge server 2300.

FIG. 9 schematically shows an example of a functional configuration of the edge server 2300.

The edge server 2300 includes a store position information acquisition unit 2302, a store product information acquisition unit 2304, a user product information acquisition unit 2306, a terminal position information acquisition unit 2308, a notification processing execution unit 2310, and a movement direction detection unit 2312. The edge server 2300 does not necessarily need to have all of these components.

The store position information acquisition unit 2302 acquires the store position information. For example, the store position information acquisition unit 2302 receives the store position information from the edge server 2400 provided in the store 2042. The edge server 2400 may transmit the store position information, registered by a store manager, an employee, or the like of the store 2042, to the edge server 2300. The edge server 2400 may include a GPS unit, and may transmit the position information, acquired by the GPS unit, to the edge server 2300. The edge server 2400 may transmit the position information, received from the GPS unit provided in the store 2042, to the edge server 2300.

The store product information acquisition unit 2304 acquires store product information. The store product information acquisition unit 2304 may use the product information received from the edge server 2400, to generate the store product information. The store product information acquisition unit 2304 may acquire the store product information notified by a store manager, an employee, and the like of the store 2042. The store product information acquisition unit 2304 may cooperate with a POS system and the like to acquire the store product information about the store 2042.

The store product information acquisition unit 2304 may further acquire store stock information indicating the stock level of the product 2062 in the store 2042. The store product information acquisition unit 2304 may use the product information received from the edge server 2400 to generate the store stock information. The store product information acquisition unit 2304 may acquire the store stock information notified by a store manager, an employee, and the like of the store 2042. The store product information acquisition unit 2304 may cooperate with a POS system and the like to acquire the store stock information about the store 2042.

The user product information acquisition unit 2306 acquires user product information. The user product information may further include a condition on a price of the product 2062.

The terminal position information acquisition unit 2308 acquires terminal position information. The terminal position information acquisition unit 2308 may continuously acquire the terminal position information.

Based on the user product information, the store product information, the store position information, and the terminal position information, the notification processing execution unit 2310 executes notification processing for the mobile terminal 2700, when the position of the mobile terminal 2700 and the position of the store 2042 selling the product 2062 indicated by the user product information satisfy a predetermined condition.

For example, the notification processing execution unit 2310 executes the notification processing for the mobile terminal 2700, when the mobile terminal 2700 is positioned within a predetermined range from the store 2042 that sells the product indicated by the user product information. The notification processing execution unit 2310 may execute the notification processing for the mobile terminal 2700 upon detecting separation of the mobile terminal 2700 from the store 2042 that sells the product indicated by the user product information.

The notification processing execution unit 2310 may execute the notification processing for the mobile terminal 2700, when the position of mobile terminal 2700 and the position of the store that sells the product 2062 indicated by the user product information at a price that satisfies the condition on the price of the product 2062 satisfy a predetermined condition. For example, the condition on the price of the product 2062 may indicate the upper limit of the price, and the notification processing execution unit 2310 executes the notification processing for the mobile terminal 2700 when the position of the mobile terminal 2700 and the position of the store that sells the product 2062 indicated by the user product information at a price lower than the upper limit satisfy a predetermined condition.

The notification processing execution unit 2310 may execute the notification processing for the mobile terminal 2700 when the position of the mobile terminal 2700 and the position of the store 2042 that sells the product indicated by the user product information and has the product stocked satisfy a predetermined condition.

The movement direction detection unit 2312 uses a plurality of pieces of terminal position information acquired by the terminal position information acquisition unit 2308 to detect the movement direction of the mobile terminal 2700. The notification processing execution unit 2310 may execute notification processing when the mobile terminal 2700 is positioned within a predetermined range from the store 2042 that sells the product 2062 indicated by the user product information, for notifying the mobile terminal 700 of the store 2042 and a store 2042 that is positioned on the movement direction detected by the movement direction detection unit 2312 and sells the product indicated by the user product information. The notification processing execution unit 2310 may execute notification processing for also notifying the sales condition of the product 2062 in each of the stores 2042. For example, the sales condition includes a selling price of the product 2062. Thus, the user 2710 can be notified of the fact that the product 2062 as the purchasing target is sold in both of the store 2042 that is nearby and the store 2042 that is positioned on the movement direction, as well as the selling price in each of these.

In the embodiment described above, a case where the edge server 2300 is the information processing device is mainly described, but this should not be construed in a limiting sense. The communication terminal 2600 may be the information processing device.

Figure 10:
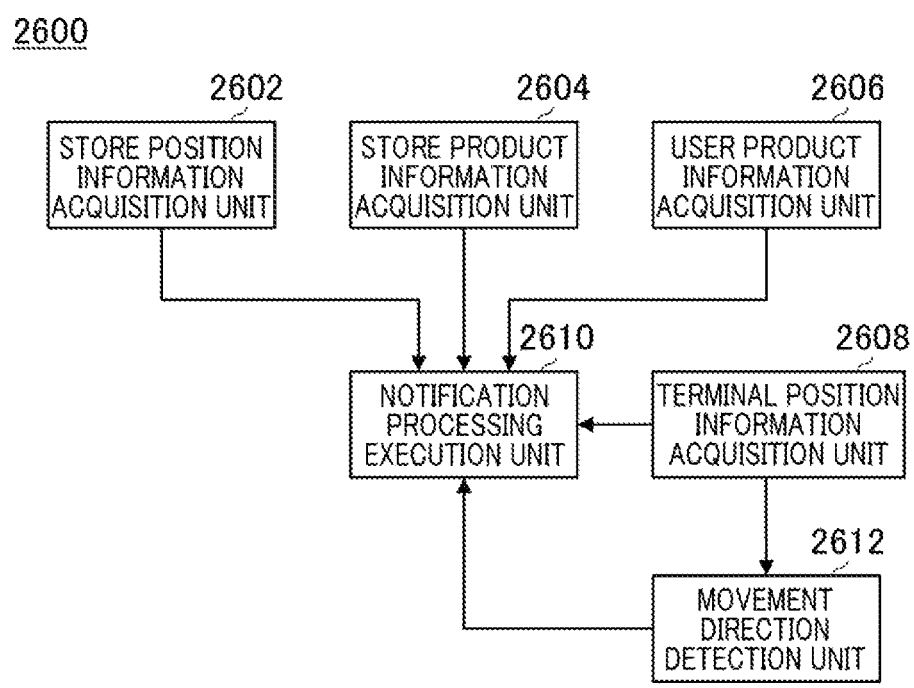
FIG. 10 schematically shows an example of a functional configuration of a communication terminal 2600.

FIG. 10 schematically shows an example of a functional configuration of the communication terminal 2600. The communication terminal 2600 includes a store position information acquisition unit 2602, a store product information acquisition unit 2604, a user product information acquisition unit 2606, a terminal position information acquisition unit 2608, a notification processing execution unit 2610, and a movement direction detection unit 2612. Here, a difference from FIG. 9 will be mainly described.

For example, the store position information acquisition unit 2602 receives the store position information, transmitted by the edge server 2400 provided in the store 2042, via the cloud network 2010.

For example, the store product information acquisition unit 2604 receives the product information, transmitted by the edge server 2400, via the cloud network 2010, and uses the product information to generate the store product information. The store product information acquisition unit 2604 may acquire the store product information notified by a store manager, an employee, and the like of the store 2042. The store product information acquisition unit 2604 may cooperate with a POS system and the like to acquire the store product information about the store 2042. The store product information acquisition unit 2604 may further acquire the store stock information.

The user product information acquisition unit 2606 may execute similar processing as the user product information acquisition unit 2306. The terminal position information acquisition unit 2608 may execute similar processing as the terminal position information acquisition unit 2308. The notification processing execution unit 2610 may execute similar processing as the notification processing execution unit 2310. The movement direction detection unit 2612 may execute similar processing as the movement direction detection unit 2312.

Third Embodiment

Figure 11:
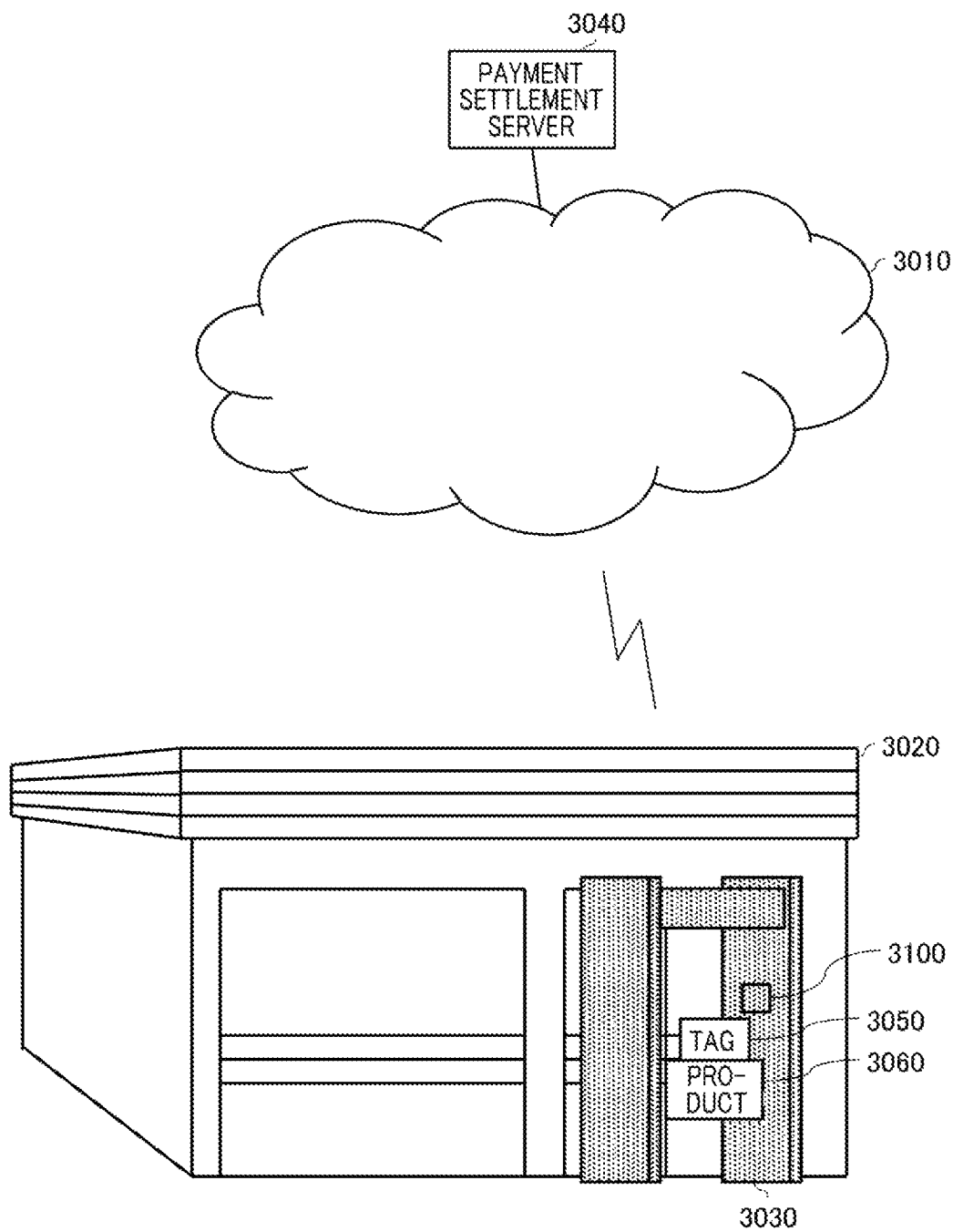
FIG. 11 schematically shows an example of a rewriting device 3100.

FIG. 11 schematically shows an example of a rewriting device 3100. The rewriting device 3100 according to the present embodiment rewrites owner identification information, for identifying the owner of a product 3060, stored in a radio tag 3050 attached to the product 3060, in response to transferring of the ownership of the product 3060. The attachment of the radio tag 3050 to the product 3060 may be attachment to the outer surface of the product 3060, or incorporation in the product 3060.

FIG. 11 shows an example of a case where the rewriting device 3100 is provided in a gate 3030. The gate 3030 performs payment settlement for a product 3060 provided within the gate 3030, and rewriting of the owner identification information of the radio tag 3050 attached to the product 3060. For example, the gate 3030 may be provided at an exit of a store 3020, and have a structure for allowing the product 3060 to pass the gate 3030, when the payment settlement for the product 3060 and the rewriting of the owner identification information are completed.

The rewriting device 3100 receives information about the product 3060 from the radio tag 3050 of the product 3060 provided within the gate 3030. The radio tag 3050 may transmit identification information about the product 3060. The radio tag 3050 may also transmit the price of the product 3060. When the radio tag 3050 does not transmit the price of the product 3060, the rewriting device 3100 transmits the identification information about the product 3060 to a payment settlement server 3040 via a network 3010, and receives the price of the product 3060 from the payment settlement server 3040. The network 3010 includes the Internet and a telephone network for example.

The rewriting device 3100 acquires credit information about a purchaser that purchases the product 3060. The rewriting device 3100 may acquire the credit information read by a card reader of the gate 3030, from a credit card of the purchaser. The rewriting device 3100 may receive credit information about the purchaser from a mobile phone of the purchaser.

The rewriting device 3100 performs the payment settlement for the product 3060 by using the information about the product 3060 and the credit information acquired. For example, the rewriting device 3100 may perform the payment settlement for the product 3060, by transmitting the information about the product 3060 and the credit information to the payment settlement server 3040.

In response to the completion of the payment settlement, the rewriting device 3100 rewrites the content of the owner identification information of the radio tag 3050 with the credit information. When the store 3020 sells the product 3060, for example, the identification information about the store 3020 or identification information about the manufacturer may be stored as the owner identification information of the radio tag 3050, and the rewriting device 3100 rewrites the identification information with the credit information. Thus, the rewriting device 3100 can rewrite the owner identification information of the radio tag 3050 attached to the product 3060, in response to the transferring of the ownership of the product 3060.

With a mechanism for storing the owner identification information about the product 3060 thus provided to the radio tag 3050 attached to the product 3060, shoplifting and resale can be deterred. For example, a second-hand shop and the like may not purchase the product 3060 if the owner identification information stored in the radio tag 3050 attached to the product 3060 and the identification information about a person who is trying to sell the product 3060 do not match, so that an unauthorized resale can be prevented.

The identification information about the product 3060 and the identification information about the owner of the product 3060 may be managed on a network, but this involves recording of the personal information on the network and thus is not preferable in terms of personal information protection. On the other hand, with the rewriting device 3100 according to the present embodiment, the owner of the product 3060 can be managed without recording the personal information on the network.

Figure 12:
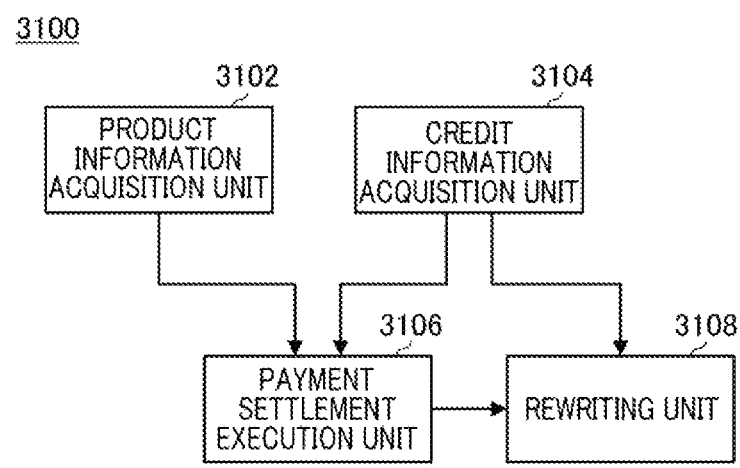
FIG. 12 schematically shows an example of a functional configuration of a rewriting device 3100.

FIG. 12 schematically shows an example of a functional configuration of the rewriting device 3100. The rewriting device 3100 includes a product information acquisition unit 3102, a credit information acquisition unit 3104, a payment settlement execution unit 3106, and a rewriting unit 3108.

The product information acquisition unit 3102 acquires information about the product 3060. For example, the product information acquisition unit 3102 acquires the information about the product 3060 transmitted by the radio tag 3050 attached to the product 3060. The information about the product 3060 may include the identification information about the product 3060. The information about the product 3060 may include the product name. The information about the product 3060 may include the price of the product 3060.

The credit information acquisition unit 3104 acquires the credit information about the purchaser that purchases the product 3060. For example, the credit information acquisition unit 3104 acquires the credit information read from a credit card of the purchaser by a card reader. The credit information acquisition unit 3104 may acquire the credit information read from a mobile phone of the purchaser. For example, the credit information acquisition unit 3104 acquires the credit information from the mobile phone via an NFC and the like.

The payment settlement execution unit 3106 uses the information about the product 3060 acquired by the product information acquisition unit 3102 and the credit information acquired by the credit information acquisition unit 3104 to perform the payment settlement for the product 3060. For example, the payment settlement execution unit 3106 performs the payment settlement for the product 3060 by transmitting the information about the product 3060 and the credit information to the payment settlement server 3040.

The rewriting unit 3108 rewrites the content of the owner identification information of the radio tag 3050 of the product 3060 with the credit information acquired by the credit information acquisition unit 3104 in response to the completion of the payment settlement by the payment settlement execution unit 3106. The rewriting unit 3108 may rewrite the owner identification information of the radio tag 3050 with encrypted information obtained by encrypting the credit information.

The rewriting unit 3108 may rewrite the owner identification information of the radio tag 3050 with encrypted information obtained by encrypting a combination of the information about the product 3060 and the credit information. For example, the rewriting unit 3108 rewrites the owner identification information of the radio tag 3050 with encrypted information obtained by encrypting a combination of the product name of the product 3060 and the credit information.

Any method may be used as a method of the encryption. For example, the rewriting unit 3108 encrypts the credit information by using public key cryptography. For example, the rewriting unit 3108 encrypts information that is a combination of the information about the product 3060 and the credit information by public key cryptography.

Figure 13:
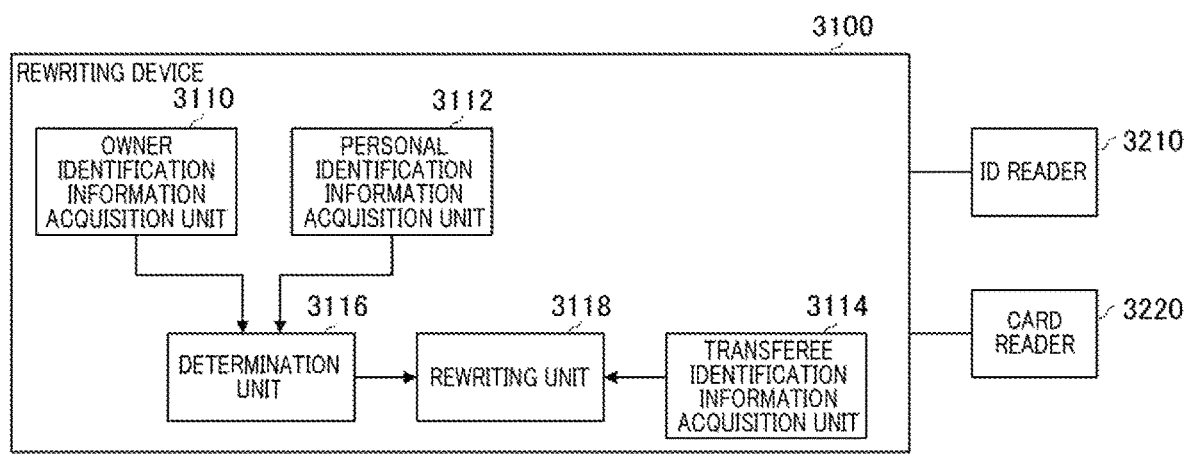
FIG. 13 schematically shows another example of the functional configuration of a rewriting device 3100.

FIG. 13 schematically shows another example of the functional configuration of the rewriting device 3100. The rewriting device 3100 shown in FIG. 13 has a function of rewriting, when the product 3060 is transferred to a transferee from the owner, the content of the owner identification information about the product 3060, which is the owner identification information about the current owner, with transferee identification information for identifying the transferee.

The rewriting device 3100 includes an owner identification information acquisition unit 3110, a personal identification information acquisition unit 3112, a transferee identification information acquisition unit 3114, a determination unit 3116, and a rewriting unit 3118. The rewriting device 3100 may include an ID reader 3210 and a card reader 3220.

The owner identification information acquisition unit 3110 acquires the owner identification information from the radio tag 3050 of the product 3060. The owner identification information acquisition unit 3110 may acquire the owner identification information read from the radio tag 3050 by the ID reader 3210. When the owner identification information is encrypted information, the owner identification information acquisition unit 3110 may decrypt the encrypted information to acquire the owner identification information.

The personal identification information acquisition unit 3112 acquires personal identification information for identifying a person. For example, the personal identification information acquisition unit 3112 acquires the credit information. The personal identification information acquisition unit 3112 may acquire the personal identification information read from a credit card by the card reader 3220.

The transferee identification information acquisition unit 3114 acquires transferee identification information for identifying the transferee of the product 3060. For example, the transferee identification information acquisition unit 3114 acquires credit information. The transferee identification information acquisition unit 3114 may acquire transferee identification information read by the card reader 3220 from a credit card.

The determination unit 3116 determines whether the owner identification information acquired by the owner identification information acquisition unit 3110 and the personal identification information acquired by the personal identification information acquisition unit 3112 match. When the determination unit 3116 determines a match, the rewriting unit 3108 rewrites the content of the owner identification information, stored in the radio tag 3050, with the transferee identification information acquired by the transferee identification information acquisition unit 3114.

For example, the rewriting device 3100 according to the present embodiment can rewrite the content of the owner identification information in the radio tag 3050 attached to the product 3060, with the current owner of the product 3060 causing the card reader 3220 to read his or her credit card and with the transferee causing the card reader 3220 to read his or her credit card, so that the product 3060 can be appropriately transferred.

Note that although the example where the personal identification information acquisition unit 3112 acquires the credit information read by the card reader 3220 is described herein, this should not be construed in a limiting sense. If the rewriting device 3100 is a rewriting device 3100 dedicated to a certain individual, the rewriting device 3100 may store identification information about the individual in advance, and the personal identification information acquisition unit 3112 may read out the identification information stored in advance.

Figure 14:
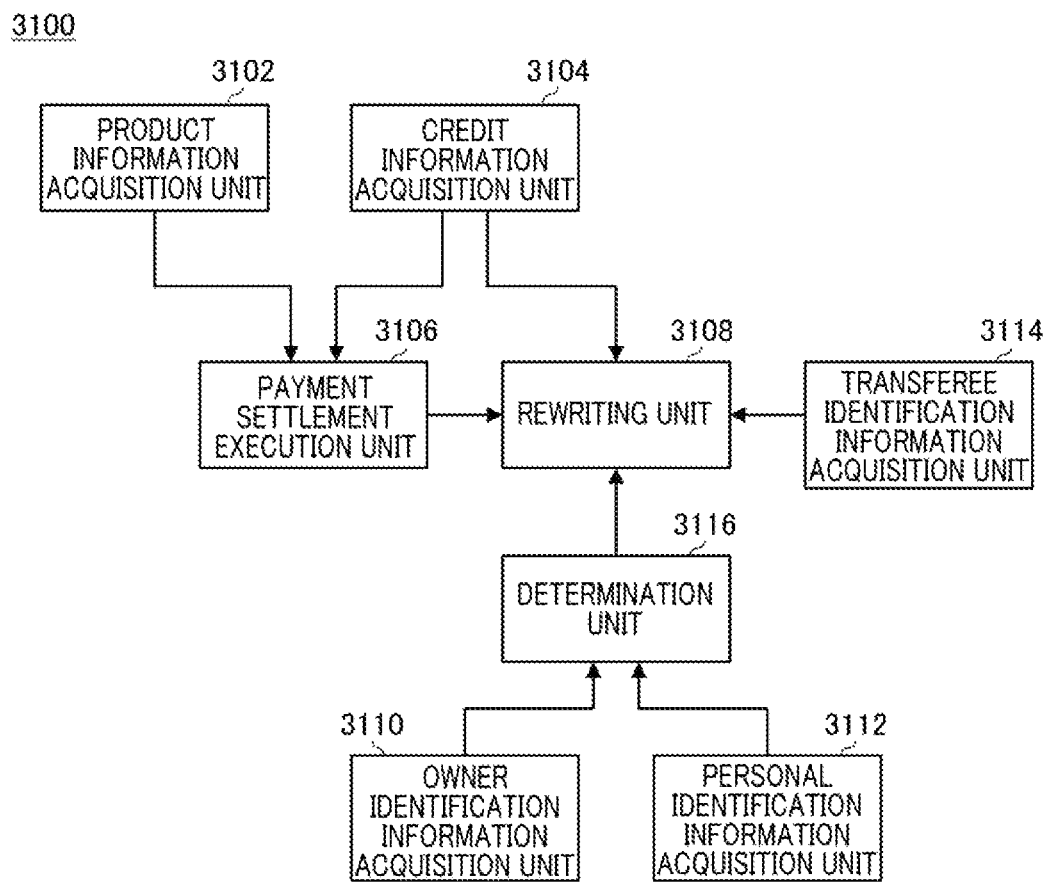
FIG. 14 schematically shows another example of the functional configuration of a rewriting device 3100.

FIG. 14 schematically shows another example of the functional configuration of the rewriting device 3100. The rewriting device 3100 shown in FIG. 14 has both the function of the rewriting device 3100 shown in FIG. 12 and the function of the rewriting device 3100 shown in FIG. 13. Specifically, the rewriting device 3100 shown in FIG. 14 includes a product information acquisition unit 3102, a credit information acquisition unit 3104, a payment settlement execution unit 3106, a rewriting unit 3108, a personal identification information acquisition unit 3112, a transferee identification information acquisition unit 3114, and a determination unit 3116. The rewriting unit 3108 shown in FIG. 14 has both the function of the rewriting unit 3108 shown in FIG. 12 and the function of the rewriting unit 3118 shown in FIG. 13. With the rewriting device 3100 shown in FIG. 14, a device can be implemented that can execute both the payment settlement and the rewriting of the owner identification information about the product 3060, as well as the rewriting of the owner identification information in response to the transferring of the product 3060.

Figure 15:
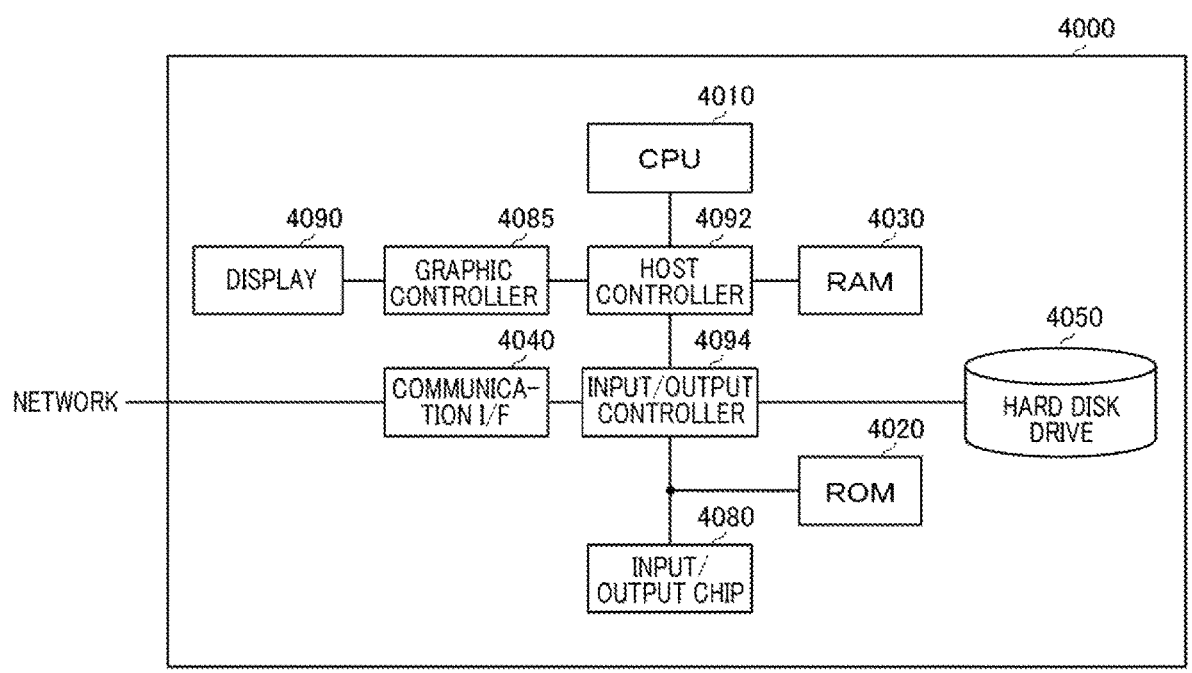
FIG. 15 schematically shows an example of a hardware configuration of a computer 4000 that functions as the edge server 2300, the communication terminal 2600, or the rewriting device 3100.

FIG. 15 schematically shows an example of a computer 4000 that functions as the edge server 2300, the communication terminal 2600, or the rewriting device 3100. The computer 4000 according to the present embodiment includes a CPU peripheral unit and an input/output unit. The CPU peripheral unit includes a CPU 4010, a RAM 4030, and a graphic controller 4085 that are connected to each other by a host controller 4092. The input/output unit includes a ROM 4020, a communication I/F 4040, a hard disk drive 4050, and an input/output chip 4080 that are connected to the host controller 4092 by an input/output controller 4094.

The CPU 4010 operates according to programs stored in the ROM 4020 and the RAM 4030, thereby controlling each unit. The graphic controller 4085 acquires image data generated, on a frame buffer provided in the RAM 4030, by the CPU 4010 and the like, and displays the image data on a display 4090. Alternatively, the graphic controller 4085 may incorporate the frame buffer that stores the image data generated by the CPU 4010 and the like.

The communication I/F 4040 performs wired or wireless communicates with another device through a network. The communication I/F 4040 functions as hardware that performs communications. The hard disk drive 4050 stores a program and data used by the CPU 4010.

The ROM 4020 stores therein a boot program executed by the computer 4000 at the time of activation, a program depending on the hardware of the computer 4000, and the like. The input/output chip 4080 connects various input/output units via a parallel port, a serial port, a keyboard port, a mouse port, and the like to the input/output controller 4094.

A program provided to the hard disk drive 4050 via the RAM 4030 is provided by a user while being stored in a recording medium such as an IC card. The program is read from the recording medium, installed in the hard disk drive 4050 via the RAM 4030, and is executed by the CPU 4010.

A program that is installed in the system 100 and causes the computer 4000 to function as the edge server 2300 may instruct the CPU 4010 and the like to cause the computer 4000 to function as each unit of the edge server 2300. The computer 4000 reads information processing written in such programs to function as the store position information acquisition unit 2302, the store product information acquisition unit 2304, the user product information acquisition unit 2306, the terminal position information acquisition unit 2308, the notification processing execution unit 2310, and the movement direction detection unit 2312 that are specific means based on cooperation between software and the various hardware resources described above. Then, by implementing calculation or processing of information in accordance with a purpose of use of the computer 4000 according to the present embodiment with these specific units, a unique edge server 2300 suitable for the purpose of use is established.

A program that is installed in the computer 4000 and causes the computer 4000 to function as the communication terminal 2600 may instruct the CPU 4010 and the like to cause the computer 4000 to function as each unit of the communication terminal 2600. The computer 4000 reads information processing written in such programs to function as the store position information acquisition unit 2602, the store product information acquisition unit 2604, the user product information acquisition unit 2606, the terminal position information acquisition unit 2608, the notification processing execution unit 2610, and the movement direction detection unit 2612 that are specific means based on cooperation between software and the various hardware resources described above. Then, by implementing calculation or processing of information in accordance with a purpose of use of the computer 4000 according to the present embodiment with these units, a unique communication terminal 2600 suitable for the purpose of use is established.

The program installed in the computer 4000 and causes the computer 4000 to function as the rewriting device 3100 may instruct the CPU 4010 and the like, to cause the computer 4000 to function as each of the units of the rewriting device 3100. The computer 4000 reads information processing written in these programs to function as the product information acquisition unit 3102, the credit information acquisition unit 3104, the payment settlement execution unit 3106, and the rewriting unit 3108 that are specific means based on software and the various hardware resources described above. Then, by implementing calculation or processing of information in accordance with a purpose of use of the computer 4000 according to the present embodiment with these specific units, a unique rewriting device 3100 suitable for the purpose of use is established.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

DESCRIPTION OF REFERENCE NUMERALS

10 cloud network, 20 network, 30 network hierarchy, 40 network hierarchy, 50 node, 52 node, 54 node, 100 system, 200 edge server, 300 edge server, 400 edge server, 402 communication unit, 404 application reception unit, 406 application storage unit, 408 application execution unit, 412 order data reception unit, 414 order data processing unit, 416 order data transmission unit, 418 order data transmission unit, 420 application deletion unit, 610 sales broker website, 620 data center, 1000 computer, 1010 CPU, 1020 ROM, 1030 RAM, 1040 communication I/F, 1050 hard disk drive, 1080 input/output chip, 1092 host controller, 1094 input/output controller, 2010 network, 2020 network, 2030 network hierarchy, 2040 network hierarchy, 2042 store, 2050 radio tag, 2060 target object, 2062 product, 2100 system, 2200 edge server, 2300 edge server, 2302 store position information acquisition unit, 2304 store product information acquisition unit, 2306 user product information acquisition unit, 2308 terminal position information acquisition unit, 2310 notification processing execution unit, 2312 movement direction detection unit, 2400 edge server, 2600 communication terminal, 2601 user, 2602 store position information acquisition unit, 2604 store product information acquisition unit, 2606 user product information acquisition unit, 2608 terminal position information acquisition unit, 2610 notification processing execution unit, 2612 movement direction detection unit, 2700 mobile terminal, 2710 user, 3010 network, 3020 store, 3030 gate, 3050 radio tag, 3060 product, 3100 rewriting device, 3102 product information acquisition unit, 3104 credit information acquisition unit, 3106 payment settlement execution unit, 3108 rewriting unit, 3110 owner identification information acquisition unit, 3112 personal identification information acquisition unit, 3114 transferee identification information acquisition unit, 3116 determination unit, 3118 rewriting unit, 3210 ID reader, 3220 card reader, 4000 computer, 4010 CPU, 4020 ROM, 4030 RAM, 4040 communication I/F, 4050 hard disk drive, 4080 input/output chip, 4085 graphic controller, 4090 display, 4092 host controller, 4094 input/output controller

What is claimed is:

1. A relay device that is provided on a first network hierarchy level and relays communications performed directly between a plurality of nodes that are subordinate to the relay device or via a network hierarchy level higher than the first network hierarchy level, between a plurality of nodes that are subordinate to the relay device and a sales broker website, the relay device comprising:

a memory configured to store a sales broker application; and a processor configured to execute the sales broker application to cause the relay device to function as:

an order data reception unit that receives order data that includes a plurality of contents and is transmitted by an orderer node that orders a product, among the plurality of nodes;

a first order data transmission unit that transmits the order data to the sales broker website; and a second order data transmission unit that transmits, when an order receiver node that receives an order for the product is any of the plurality of nodes, at least a part of the plurality of contents to the order receiver node directly, wherein the processor is further configured to delete the sales broker application from the memory when a first predetermined condition is satisfied, and to receive the sales broker application and store the sales broker application in the memory when a second predetermined condition is satisfied.

2. The relay device according to claim 1, wherein the processor is further configured to delete the sales broker application from the memory in accordance with an instruction received from the sales broker website.

3. The relay device according to claim 1, wherein in accordance with a request received from the sales broker website, the processor is further configured to receive the sales broker application from a predetermined source, and stores the sales broker application in the memory.

4. The relay device according to claim 1, wherein when the order receiver node that receives an order for the product is none of the plurality of nodes that are subordinate to the relay device, the first order data transmission unit transmits the order data to another relay device provided on a network hierarchy level higher than the first network hierarchy level.

5. A non-transitory computer-readable medium having stored thereon a program that causes a relay device that is provided on a first network hierarchy level and relays communications performed directly between a plurality of nodes that are subordinate to the relay device or via a network hierarchy level higher than the first network hierarchy level, between a plurality of nodes that are subordinate to the relay device and a sales broker website to function as:

an application storage unit that stores a sales broker application;

an application execution unit that executes the sales broker application to cause the relay device to function as:

an order data reception unit that receives order data that includes a plurality of contents and is transmitted by an orderer node that orders a product, among the plurality of nodes;

a first order data transmission unit that transmits the order data to the sales broker website; and a second order data transmission unit that transmits, when an order receiver node that receives an order for the product is any of the plurality of nodes, at least a part of the plurality of contents to the order receiver node directly;

an application deletion unit that deletes the sales broker application from the application storage unit when a first predetermined condition is satisfied; and an application reception unit that receives the sales broker application and stores the sales broker application in the application storage unit, when a second predetermined condition is satisfied.

* * * * *